July 25, 1961 P. G. HOLT 2,993,643
PILOT'S AUTOMATIC DEAD RECKONING EQUIPMENT
Filed Feb. 6, 1958 4 Sheets-Sheet 1

INVENTOR.
PLINY G. HOLT
BY
ATTORNEYS

July 25, 1961 P. G. HOLT 2,993,643
PILOT'S AUTOMATIC DEAD RECKONING EQUIPMENT
Filed Feb. 6, 1958 4 Sheets-Sheet 3

July 25, 1961 P. G. HOLT 2,993,643
PILOT'S AUTOMATIC DEAD RECKONING EQUIPMENT
Filed Feb. 6, 1958 4 Sheets-Sheet 4

INVENTOR.
PLINY G. HOLT
BY
ATTORNEYS

United States Patent Office 2,993,643
Patented July 25, 1961

2,993,643
PILOT'S AUTOMATIC DEAD RECKONING EQUIPMENT
Pliny G. Holt, Carmel, Calif., assignor to the United States of America as represented by the Secretary of the Navy
Filed Feb. 6, 1958, Ser. No. 713,772
5 Claims. (Cl. 235—61)
(Granted under Title 35, U.S. Code (1952), sec. 266)

The invention described herein may be manufactured and used by or for the Government of the United States of America for governmental purposes without the payment of any royalties thereon or therefor.

The present invention relates to automatic dead reckoning apparatus and more particularly to automatic dead reckoning apparatus for indicating continuously the position and movement of an aircraft carrying the apparatus.

Present techniques and apparatus for carrying out the purposes of this invention involve either a manual plot on a chart board on which the pilot or navigator performs the necessary operations himself, or a completely automatic system involving large, bulky, complex and expensive equipment. The manual plotting method described above requires the constant attention of the pilot or navigator and is generally of limited accuracy since it is not capable of compensating for changing conditions between plots. The automatic systems are expensive and occupy much needed space aboard aircraft. Furthermore, because of the bulkiness and weight of automatic equipment their usefulness is usually limited to the single aircraft in which they are installed.

The present invention has for one of its purposes the continuous solution and integration of the basic navigational triangle consisting of true airspeed, heading and wind velocity and direction so as to obtain ground speed, track and a continuing visual presentation thereof. This involves combining in a continuous manner aircraft speed and direction with wind speed and direction, and presenting the results thereof automatically and visually on a screen in terms of the position and movement of the aircraft carrying the apparatus. The invention is compact, of reliable construction, light in weight, relatively small in cost, and is easy and convenient to use so as to interfere to the smallest possible extent with the other duties of the pilot or navigator. It is also highly accurate, and so portable that it may be carried from aircraft to aircraft and installed with only slight difficulty.

It is thus a first object of this invention to provide compact and portable automatic dead reckoning apparatus for use aboard aircraft.

Another object of the present invention is to provide novel automatic computer apparatus capable of indicating automatically and continuously the results thereof.

A further object of this invention is the provision of automatic computing apparatus capable of combining particular navigational parameters to produce information on the exact position and movement of a vehicle carrying this apparatus.

Still another object is the provision of automatic dead reckoning apparatus capable of combining aircraft speed and heading with wind speed and direction and indicating in a particularly convenient fashion specific and detailed information on the position of the aircraft carrying the apparatus.

Still another object of this invention is apparatus for providing presentation of navigational information on the location of aircraft easily readable and subject to minimum supervision by the operator.

Another object of the invention is automatic dead reckoning apparatus providing a variety of novel features rendering said apparatus particularly adaptable for use in aircraft where the navigator is required to assume other duties preventing his full time preoccupation with navigational problems.

With these and other objects in view, as will hereinafter more fully appear, reference is now made to the following description taken in connection with the accompanying drawings in which.

Figure 1:
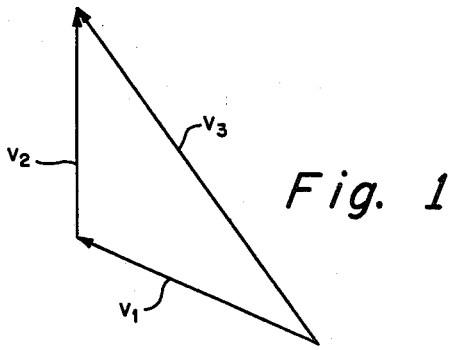
FIG. 1 illustrates the navigational triangle solved by the present invention.

Referring now to the drawings wherein like reference characters designate like or corresponding parts throughout the several views, there is shown in FIG. 1 the navigational triangle which is solved by this invention. Vector $V_1$ is for the magnitude and the direction of aircraft true air speed and is obtained, as shown below, from the magnetic heading of the aircraft compensated for magnetic deviation and variation. Vector $V_2$ forming the other leg of the triangle is for the wind velocity and direction which the pilot or navigator obtains from sources outside of this apparatus and places into the equipment manually, as will be shown below. This basic navigational triangle is closed by the ground speed vector $V_3$ which, when integrated continuously with respect to time, will give the instantaneous position of the aircraft with respect to a starting or reference point.

Figure 2:
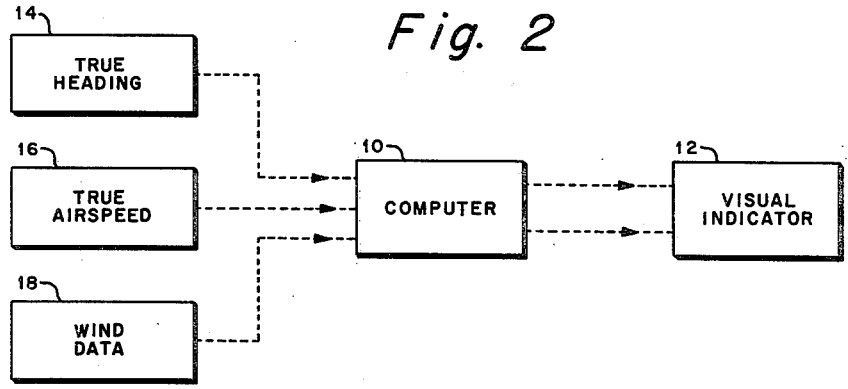
FIG. 2 illustrates a highly schematized block diagram of the system used in the automatic dead reckoning apparatus of this invention.

The system for carrying out the purposes of this invention is shown schematically and in block form in FIG. 2 and consists of a computer 10, an indicator 12 to form a convenient presentation of the output of computer 10, and the apparatus for providing the signal inputs in mechanical form to computer 10 comprising true heading unit 14, true airspeed unit 16, and wind data unit 18. The latter includes both wind velocity and direction. Computer 10, indicator 12, the apparatus of FIGS. 5, 6 and 8, to be described below, as well as the servo systems of FIGS. 7 and 9 exclusive of the compass system 30, true airspeed sensor and computer 216, and grounded servo amplifiers 214 and 314, are actually combined into a single unit 20 which is illustrated isometrically in FIG. 3.

Figure 3:
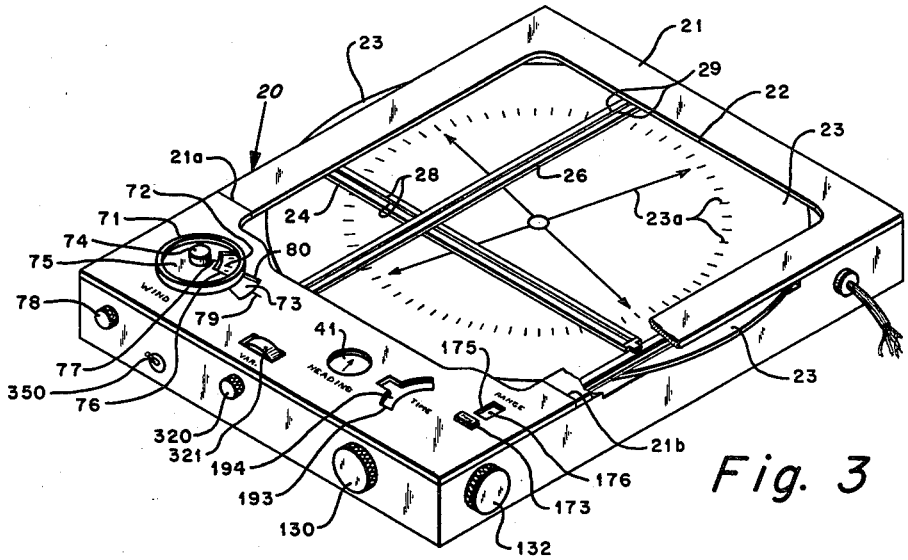
FIG. 3 is an isometric view of the computer with the built-in screen for visual presentation.

Referring to FIG. 3, unit 20 consists of an outer casing 21 having a rectangular opening 22 on one face through which is seen a circular plotting board 23 provided in this instance with compass markings 23a but which may have other more suitable markings, such as a map or grid lines. There is also provided above board 23 a pair of moving transparent, plastic cursors 24 and 26 which sweep perpendicularly to each other at all times as indicated by the arrows A and B in FIG. 4. Each cursor may be provided with a pair of closely spaced parallel hair lines 28 and 30, respectively. The intersection P of hair lines 28 and 29 would indicate, for example, the instantaneous position of the aircraft carrying unit 20. Cursors 24 and 26 are driven at their extremities by means more particularly shown in FIG. 4 in accordance with information supplied, as described further below. Markings on a transparent overlay (not illustrated) or on plotting board 23 can indicate the base or reference point so that the observer will have a picture of his relative position at all times. In order to bring the aircraft to a reference point on plotting board 23, the pilot need only "fly" point P to this point. The face of unit 20 may also be provided with various dials, switches, knobs and indicators to be described below, and hinges at 21a and 21b to facilitate the mounting of plotting board 23 and overlays.

Figure 4:
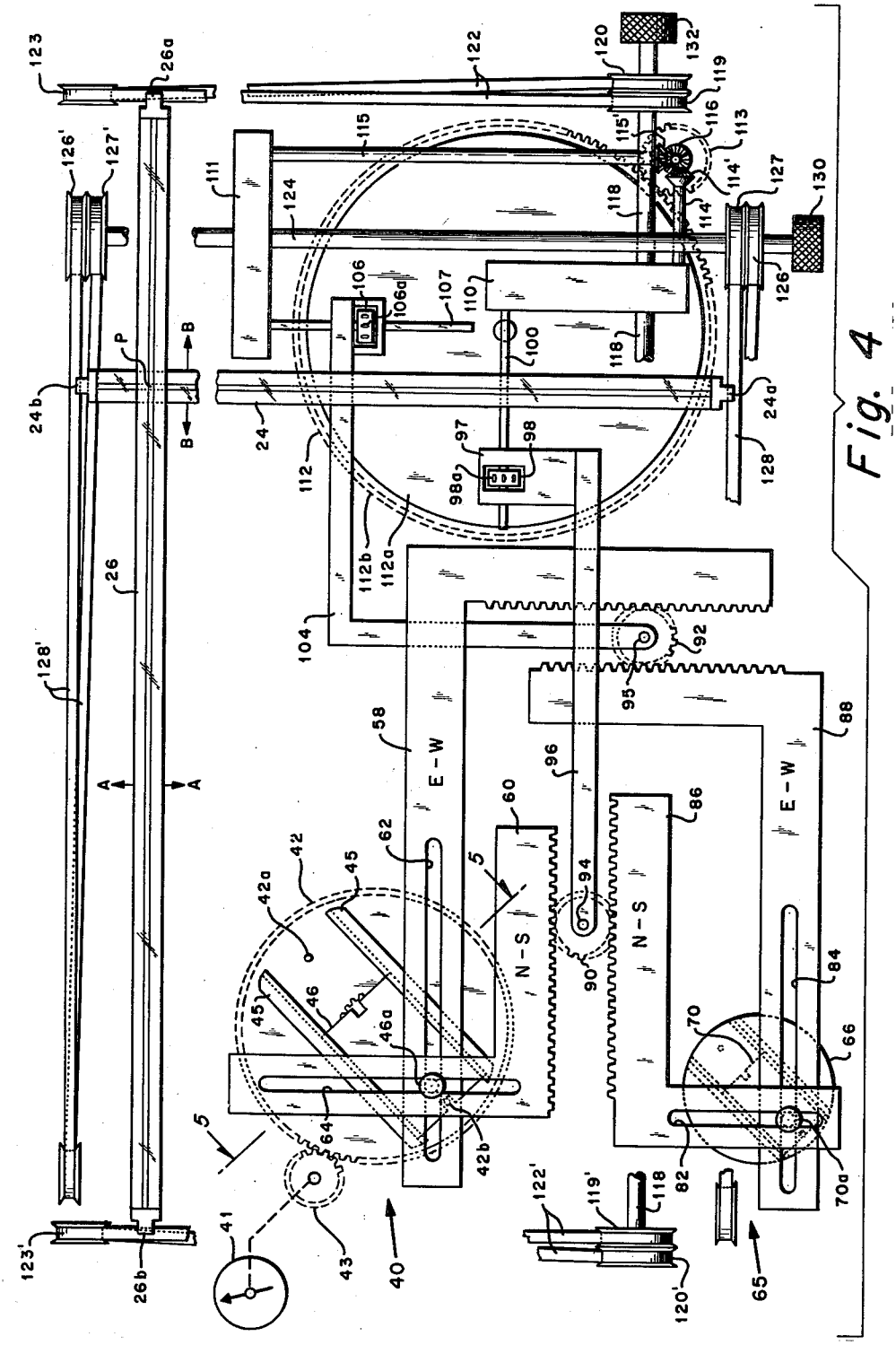
FIG. 4 is a schematic illustration of the basic computer elements and associated visual elements within the computer illustrated in FIG. 3.
Figure 5:
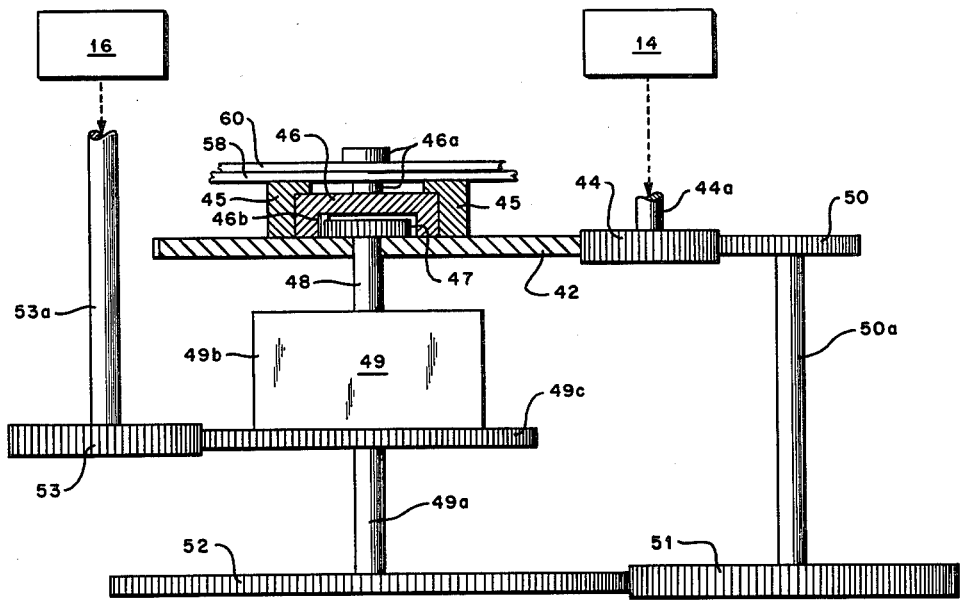
FIG. 5 shows a detailed section view of a portion of the computer illustrated in FIG. 4.

FIG. 4 shows a schematic illustration of the operative elements of computer 10 and indicator 12 making up the interior of unit 20, serving to drive cursors 24 and 26. True aircraft speed and heading information is supplied to a resolver 40 comprising a resolver wheel 42 which may be toothed along its outer circumference and driven by a pinion 44 on a shaft 44a from true heading unit 14 as illustrated in FIG. 5. Mounted rigidly on one face of resolver wheel 42 is a pair of spaced parallel guides 45 supporting a slidable member 46 which has extending therefrom at one end a cylindrical guide pin 46a. The position of slide member 46 along the face of wheel 42 is determined by the output of true airspeed unit 16 delivered through a mechanical gear arrangement to be described below in connection with FIG. 5 where it is more particularly shown. Stop pins 42a and 42b on resolver wheel 42 prevent overrun of slide member 46. Slide member 46 is provided with an internal rack 46b mating with a pinion 47 mounted on an output shaft 48 passing through an opening in the center of resolver wheel 42. By a compensating feedback mechanical arrangement best illustrated in FIG. 5, there is provision to make pinion 47 rotate with wheel 42 when there is no change in output from true airspeed unit 16 so as to maintain slidable member 46 stationary along wheel 42, and generally to compensate for the rotation of wheel 42. For this purpose, a spur gear differential 49 of the type illustrated and described in the Department of the Navy Ordnance Phamplet 1140 titled, "Basic Fire Control Mechanisms," Sept. 1944, page 46, is provided. Input shaft 49a to differential 49 is driven from true heading unit 14 through pinion 44 mounted on a shaft 44a, gear 50, shaft 50a, pinion 51, and gear 52. With the outer casing 49b of differential 49 held stationary through a toothed flange 49c, attached to casing 49b, by a pinion 53 and shaft 53a connected to unit 16, output shaft 48 from differential 49 will rotate in a direction opposite that of shaft 49a. With proper gear ratios selected, pinion 47 will rotate at exactly the same rotational speed as gear 42 and hence no movement of member 46 will occur when there is no change in position of shaft 53a. However, as a change in true airspeed occurs and a net signal from unit 16 is delivered through shaft 53a to pinion 53 and differential casing 49b, pinion 47 will begin to rotate at a different speed than wheel 42 causing a net movement of member 46 to indicate the new true airspeed of the aircraft.

For engagement with guide pin 46a there is provided, as best shown in FIG. 4, a pair of L-members 58 and 60 having slots 62 and 64, respectively, in one leg of each. Members 58 and 60 are mounted in any convenient fashion for slidable movement parallel to their respective slots 62 and 64 and perpendicular to each other. The movement of pin 46a will move each of the slidable members 58 and 60 in perpendicular directions and in accordance with the East-West and North-South coordinate movements of pin 46a, respectively. A gear 43 driven by wheel 42 positions a dial 41 mounted on the facing of casing 22 to indicate to the observer the true heading of the aircraft.

In a similar manner there is provided a resolver 65 comprising a wheel 66 and a slide member 70 for actuation in response to the direction and magnitude of wind velocity, respectively. For positioning wheel 66 and slide member 70 in accordance with wind direction and speed, the face of unit 20 is provided with a dial assembly 71 consisting of speed dial 72 calibrated in knots and an azimuth dial 73. A knurled knob 74 rotates a disc 75 with an opening 76 and a hairline marker 77 exposing dial 72 for driving a pinion (not shown) under slide member 70 similar to pinion 47 under slide 46 to position the latter in accordance with wind speed. A knurled knob 78 on the side of unit 20 permits, when in a locked position, the operation of knob 74 as just described. When knob 78, however, is turned to release assembly 71, then knob 74 will turn assembly 71 due to a frictional clutch arranged (not shown) to rotate azimuth dial 73 past hairline marker 79 adjacent opening 80 exposing dial 73, thereby permitting selection of wind direction. Assembly 71 when rotated turns wheel 66 along with the pinion under slide member 70 thereby insuring relative movement of the latter when changing the wind direction.

Returning to FIG. 4, a pin 70a protruding from some convenient point along one face of slidable member 70 engages with a pair of slots 82 and 84 in the respective legs of L-members 86 and 88. L-members 86 and 88 are positioned along their line of movement along their respective slots so that pin 70a represents North-South and East-West components of wind velocity accomplished by the combined rotation of wheel 66 and the slidable movement of member 70. As will be seen from the illustration, each of L-members 58, 60, 86 and 88 is provided with a leg having a rack so situated with respect to each other that the racked edges of the various L-members are paired off for combining the respective N—S and E—W components through respective differential wheels 90 and 92. As is understood in the art, each of the differential wheels 90 and 92 performs the addition and subtraction of the N—S and E—W components resulting in net displacement of the centers of the differential wheels in accordance therewith. Differential wheels 90 and 92 rotate about shafts 94 and 95, respectively, and shaft 94 of differential wheel 90 is connected to one end of an elongated rod 96 and shaft 95 of wheel 92 is connected to one end of an elongated member 104. Rod 96 is of convenient shape terminating at its opposite end in a mounting 97 for a rotatable shaft 100 carrying a wheel 98 mounted for frictional engagement with a constant speed integrating disc 112. A spring or other bias means (not illustrated) may be used to insure continuous contact between wheel 98 and the surface of disc 112. As is understood in the art, disc 112 is provided with a high friction surface 112a, while wheel 98 has wheels 98a imbedded in the outer rim thereof for permitting relatively free slidable movement transverse to the direction of rotation of wheel 98. Wheel 98 is keyed to rotate shaft 100, but is mounted to permit slidable movement along the axis thereof. In a similar fashion, elongated rod 104 is shaped so that on its opposite end there is an integrating wheel 106 with wheels 106a imbedded therein and mounted for rotation with shaft 107. Wheels 98 and 106 are orientated on radii of disc 112 and rotate in planes tangential to the circumferences of the disc at their respective points on the radii. They drive their respective shafts 100 and 107 for transmitting the rotational forces to the interior of differential mechanisms 110 and 111, respectively, for a purpose to be described below.

As is understood in the art, the speeds of rotation of wheels 98 and 106 are determined by their respective distances from the center of rotation of disc 112 and the latter's speed of rotation. Integrating disc 112 may be provided with gear teeth 112b to be driven at a constant, selectable speed through a pinion 113 by special apparatus illustrated in FIG. 5 and described below. The second inputs to differential mechanisms 110 and 111 are from pinion 113 through any gear arrangement such as the one consisting of shafts 114 and 115 terminating in beveled gears 114' and 115', respectively, engaged with a bevel pinion 116 rigidly connected to pinion 113. Differential mechanism 110 compares the input from shaft 100 to that from shaft 114 and drives an output shaft 118 extending across the width of unit 21 to a pulley arrangement consisting of a pair of take-up pulley wheels or spools 119 and 120 on one side of unit 21 and take-up pulley wheels 119' and 120' at the other side. Cables 122 and 122' of flat cross-section running along each side of unit 21 pass over idler wheels 123 and 123', respectively, and have the ends thereof wrapped on the respective take-up spools 119, 120 and 119', 120'. Cursor 26 is connected at its ends at 26a and 26b to pulley cables 122 and 122', respectively, to be driven thereby in the direction of arrows A in accordance with the output of differential mechanism 110. In a similar manner, differential mechanism 111 produces an output on its shaft 124 to drive take-up pulley spools 126, 127 and 126', 127', and cables 128, 128' to drive cursor 24 perpendicularly to cursor 26 along the direction indicated by arrows B. A pair of knurled knobs 130 and 132 mounted on the outside of casing 21 shown in FIG. 3 is provided to permit adjustment of cursors 24 and 26 independently of differentials 111 and 110. A pressure released spring clutch (not shown) may be provided as is understood in the art, so that by pressing in knobs 130 and 132, drive from shafts 124 and 118, respectively, are released and cursors 24 and 26 may be moved. It will be seen that the speed of integrating disc 112 as fed into differential mechanisms 110 and 111 establishes a datum speed for integrating wheels 98 and 106 such that at some point on disc 112 for each wheel the latter will be turning at a speed to balance exactly the speed of the second input to its differential from pinion 113. In these positions, of course, the particular cursor driven by its respective wheel will be stationary. As movement of L-member 60, for example, results in movement of wheel 98 closer to or farther away from the center of disc 112, cursor 26 will be moved in one direction or another reflecting a greater or lesser speed input to differential 110 than through the second input shaft 114. As is understood in the art, the arrangement just described provides for the integration of the East-West and North-South components and movement of cursors 24 and 26, respectively, in accordance therewith. The speed of rotation of integrating disc 112 will also determine the rate of speed at which the cursors will move and in effect establishes the range for the whole apparatus. By including mechanism for changing the speed of rotation of integrating disc 112 there will be provided a manner of changing the range of the apparatus as shown on the visual presentation or chart board 23 of this apparatus. The arrangement for establishing the speed of integrating disc 112 and changing it selectively for choosing various ranges is illustrated in FIG. 6.

Figure 6:
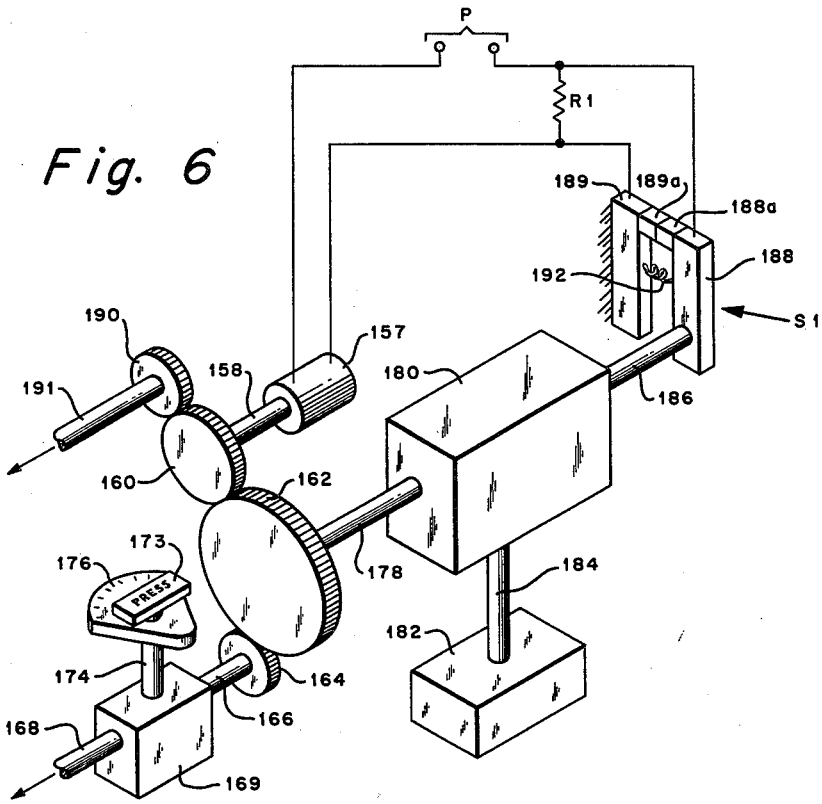
FIG. 6 illustrates the arrangement for driving the integrator disc shown in FIG. 4.

Referring to FIG. 6, an electric motor 157 drives disc 112 through a shaft 158 connected to a pinion 160, a gear 162, a gear 164, shaft 166, a variable speed transmission 169, and shaft 168 which is connected in conventional fashion to drive disc 112. A manually depressable and rotatable knob member 173 with a dial 176 connected by a shaft 174 into transmission 169 is provided to select the particular gear ratio and thereby select the particular speed of rotation. An opening 175 labeled "RANGE" on the face of unit 21 is provided to indicate the range as illustrated in FIG. 3. Speed-changing transmission 169 may be of conventional design to shift or alter the ratio of driving speed between an input shaft and an output shaft. In order to insure a very closely regulated constant speed of rotation of integrator disc 112, a feedback arrangement from gear 162 back to motor 157 for insuring this close regulation is provided. The feedback consists of a shaft 178 connected to be driven by gear 162 to provide a first input to a conventional differential unit 180. The second input to differential unit 180 is from an escapement mechanism 182 through a shaft 184. The output shaft 186 of differential 180 is connected to a pivotal arm 188 of a switch S1 mounted on shaft 186 for limited rotatable movement. Connected on the free end of pivotal arm 188 is a contact 188a. The stationary arm 189 of switch S1 is provided with a similar contact 189a adjacent contact 188a. A spring 192 biases movable arm 188 to provide normal contact between the arms 188 and 189 through their respective contact elements 188a and 189a. Electric motor 157 is of the permanent magnet type and is wired from a power source P through switch S1 in series with a resistor $R_1$ connected across switch S1, and has a speed with S1 closed normally slightly in excess of that required. During the normal operation of electric motor 157 with switch S1 closed, escapement mechanism 182 maintains the second input to differential 180 through shaft 184 at constant desired speed. As electric motor 157 overspeeds slightly, this is reflected by a net output shaft rotation on shaft 186 in the clockwise direction which breaks the electrical contact between the movable and stationary and movable elements 188 and 189. As a result, the current from the power source P to electric motor 157 is forced to pass through resistor $R_1$ which thereby reduces the voltage across motor 157 and results in a reduction in this speed. As a result, motor 157 slows down and the speed of shaft 178 is reduced to the extent that switch S1 is then opened. Motor 157 then overspeeds thereby causing a new cycle of the type just described. In practice it has been found that switch arm 188 is vibrating continuously, but the overall speed of integrator shaft 112 is maintained virtually constant. This feedback arrangement just described is known in the art and is described in detail beginning in page 208 of Ordnance Pamphlet 1140 referred to above. A pick-off gear 190 transmits the speed of motor 157 through a shaft 191 to a dial exposed through an opening 193 on the face of unit 21 for timing purposes, as illustrated in FIG. 3. Timer dial 194 may consist of a pair of concentric members calibrated in minutes and hours, as is understood in the art, and can be used to indicate the elapsed time from any particular starting point.

Figure 7:
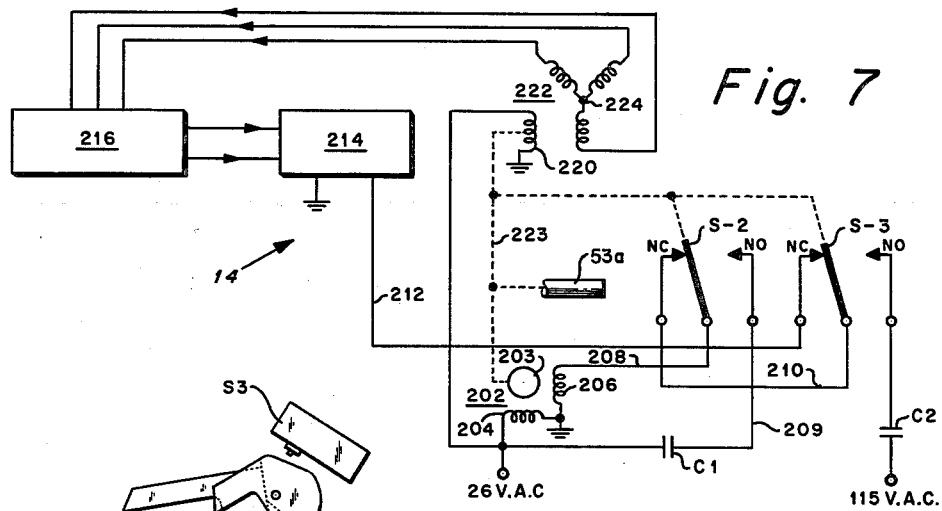
FIGS. 7 and 9 show details of the true airspeed and heading units.

The details of true airspeed unit 16 providing one input to resolver 40 as illustrated in FIG. 5 are shown in FIG. 7. Electric motor 202 consists of a rotor 203, a fixed phase coil 204 and a control or variable phase coil 206, and drives shaft 53a. Fixed phase coil 204 is supplied from a source of 26 volt A.C. power supply. Variable phase coil 206 is connected to receive its signal normally through the NC position of a micro-switch S2, by lines 208 and 210, through the NC position of a micro-switch S3, and a line 212 from servo amplifier 214. Amplifier 214 receives its signal from the true airspeed computer 216 of known design, such as in commercially available equipment Kollsman type C-2. As part of the feedback of the servo loop, rotor 203 of motor 202 positions a rotor 220 in a synchro transmitter 222 by mechanical means 223 shown schematically. Rotor 220 is energized directly from the 26 volt A.C. source as illustrated, while stator 224 of transmitter 222 transmits a signal in accordance with the position of rotor 220 back to computer 216 where is provided as understood in the art, a synchro receiver, and apparatus to produce an error signal for amplifier 214. The system just described is self-balancing, as is understood in the art, because electric motor 202 rotates to a null point and thereafter remains during operation at the null position which will vary in accordance with the true airspeed of the aircraft. In this manner the position of slide member 46 in FIGS. 4 and 5 is maintained via shaft 53a driven by mechanical means 223, in a position at all times reflecting the true airspeed of the aircraft. Rotor 203 repositions switches S2 or S3 under certain circumstances which are described below.

If the automatic dead reckoning apparatus is turned off when slide member 46 is at one end position (as illustrated in FIG. 4) and is turned on again when the speed of the aircraft has changed considerably, representing over 180° phase shift in current, re-energization of the apparatus will result in slide member 46 being forced against its stop 42a or 42b in its existing extreme position in an attempt to move to its new position by continuing in the same direction. While provision can be made for the operator to initiate action to bring slide member 46 back into operation, there is provided automatic switching apparatus comprising the micro-switches S2 and S3 described above illustrated electrically in FIG. 7, and mechanically in FIG. 8 for accomplishing this purpose. As will be described below in connection with FIG. 8, switches S2 and S3 are arranged so that when motor 202 reaches one extreme position for slide member 46, the movable element of switch S2 is placed in its NO position. When this occurs, the 26 volt A.C. supply is passed through line 209 and a condenser C1 to the variable phase coil 206 to drive motor 202 back away from its extreme position. Condenser C1 reverses the phase of the supply voltage to accomplish this. When slide 46 reaches its dead center position in its reverse or correction movement, the movable element of switch S2 is kicked back to its NC position by the mechanical arrangement illustrated in FIG. 8. Should motor 202 reach its other extreme position, the mechanical arrangement is such that the movable element of switch S3 is kicked over to its NO position in which case the 115 volt A.C. supply is passed through a condenser C2 to drop the voltage to 26 v. and shift the phase of variable phase coil 206 of motor 202 which again acts to drive slide 46 back away from its extreme position. After reaching the dead center point, the movable element of switch S3 is kicked back into NC position for normal operation again.

Figures 8, 8A:
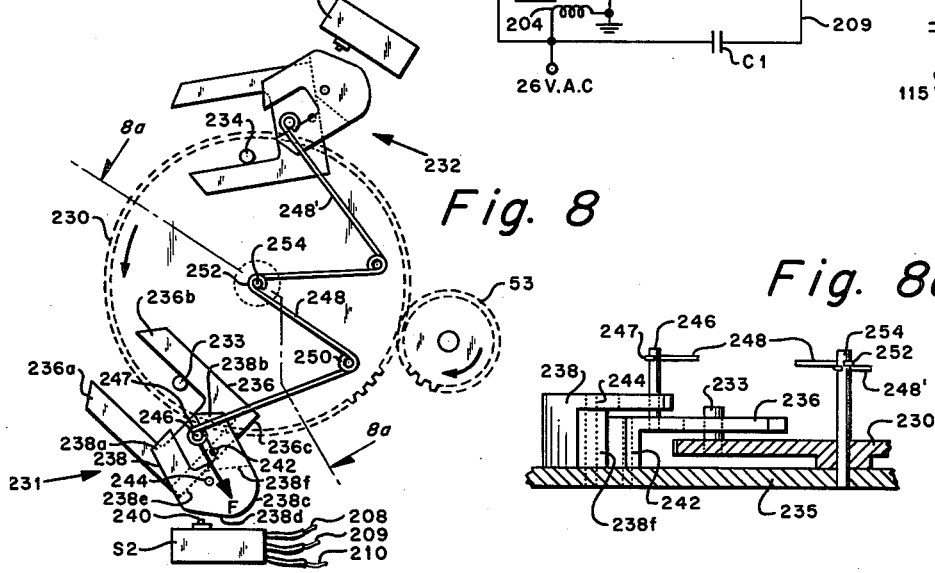
FIGS. 8 and 8a show details of the switch arrangement illustrated electrically in FIG. 7, FIG. 8a being a section along line 8a—8a of FIG. 8.

Referring to FIGS. 8 and 8a for the details of the switching apparatus just mentioned, there is shown a wheel 230 which may be toothed to be driven by a pinion 53 (shown in FIG. 5) which indicates the position of slidable element 46. Wheel 230 is provided with a pair of tripping mechanisms 231 and 232 coacting with wheel 230 as hereinafter described. Wheel 230 is provided with a pair of pins 233 and 234, and is mounted on the wall of a casing 235, FIG. 8a. Limiting the description of the tripping mechanisms to mechanism 231, the latter consists of a forked or control member 236, a cam or actuating member 238, and the micro-switch S2 having the three electrical leads 208, 209 and 210, and a normally raised button 240 as is understood in the art, biased into this (NC) position. Member 236 has a pair of legs 236a and 236b and a bottom surface 236c, and is mounted for rotatable movement on a pin 242 extending from casing 235. Cam member 238 has a pair of legs 238a and 238b, a circular cam surface 238c, a cutoff section 238d, and a two sided abutment 238e and 238f on its underside. Cam member 238 is mounted on a stationary pin 244 extending from casing 235 for rotatable movement thereon. When cam member 238 is positioned with the circular camming surface 238c opposite micro-switch button 240 the latter is depressed. When cam member 238 is located in a more counterclockwise position with button 240 opposite the cutoff section 238d, the former remains in its unactuated or raised position as illustrated. Forked member 236 is provided with a pin 246 adjacent pin 242 but which extends upwardly to pass between legs 238a and 238b of the cam member 238. Adjacent the top of the shaft 246 is coiled one end 247, FIG. 8a, of a spring member 248 which extends to coil at 250 and has its opposite end 252 coiled about a stationary shaft 254 extending from casing 235 through the center of wheel 230. Spring member 248 is biased so that it exerts a force in the direction indicated by arrow F, due to the coiling at 250. Thus forked member 236 is biased on its pin 246 roughly in a direction of its supporting shaft 242. When member 236 is in a counterclockwise position the force of spring 248 in the direction of arrow F from pin 246 passes to the left of shaft 242 and this tends to rotate or snap forked member 236 in its counterclockwise direction. When member 236 is in a more clockwise position, arrow F will pass to the right of supporting shaft 242, thereby biasing unit 236 in a clockwise direction.

For a more detailed description of tripping mechanisms 231 and 232, and their operation, reference is made to U.S. patent application Serial No. 713,771, filed February 6, 1958, now Patent No. 2,926,222. The limit and return tripping mechanism 231 herein described automatically trips when slide member 46 reaches one extreme position to depress button 240 and reverse its movement and trips back when slide member reaches its dead center position for a return to normal control, while tripping mechanism 232 operates at the other extreme position of slide member 46.

Figure 9:
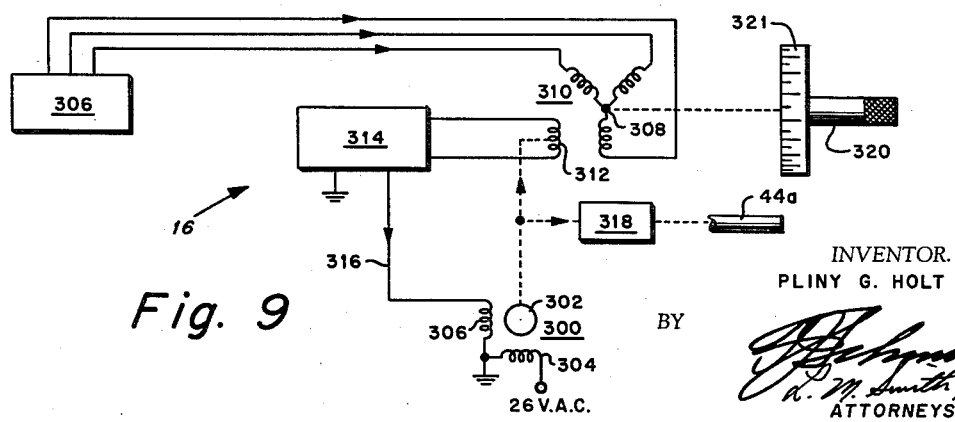

FIG. 9 illustrates the details of true heading unit 14 in which there is provided an electric motor 300 having a rotor 302, a fixed phase coil 304, and a variable phase coil 306. The compass heading signal is provided by an electrical remote indicating compass system 307 which may be comprised of any conventional or known unit for accomplishing or producing such a signal, such as the Navy MA-1 type compass system. System 307 is connected to pass a three phase servo system signal to stator 308 of a synchro receiver 310 which is also provided with a rotor 312, as is understood in the art. The signal on rotor 312 is amplified in servo amplifier 314 and passed through line 316 to variable phase coil 306 which causes the rotation of rotor 302 in the direction of nulling the signal on rotor 312 of synchro receiver 310. Rotor 302 of motor 300 is positioned continuously in accordance with the compass signal delivered by unit 307. Rotor 302 also drives shaft 44a through apparatus 318 which is provided to correct for magnetic deviation. As is understood in the art, the correction for deviation is for the purpose of correcting for the magnetic influences of the aircraft and this would be adjusted over a 360° rotation in 15° or other suitable steps. A device of this type is known in the art, and one such type is shown in U.S. Patent No. 2,590,287. In order to correct for magnetic variation, stator 308 of synchro receiver 310 is offset some angular position by a manual knob 320 having a dial 321 in accordance with the information supplied to the operator by a table of values given in a chart for the particular geographical area. It is understood that the variation is fixed for a particular location on the earth's surface and it is anticipated that this would not be set more than once or twice during any particular flight. Dial 321 and knob 320 are located on the top of unit 20, as illustrated in FIG. 3.

The operation of the automatic dead reckoning apparatus hereinabove described is as follows:

When the apparatus is installed in an aircraft the adjustments for magnetic deviation are made in unit 318. A suitable plotting board is inserted in the face of device 21 and the surface of the board may be marked with a reference point representing the initial position. Knobs 130 and 132 are depressed and rotated to move cursors 24 and 26 so that they will intersect at the reference point. When the flight is begun, magnetic variation is inserted through knob 320 and wind velocity and direction are introduced by assembly 71, which sets resolver 65. As the aircraft commences its flight and the apparatus is turned on by a switch 350 shown on the face of unit 21, the true heading and true airspeed information would be supplied to resolver wheel 42 and slide 46 in the manner described above. By the operation of resolvers 40 and 65, differential wheels 90 and 92, and the integrator wheel 112, the vector diagram illustrated in FIG. 1 is solved and the vector $V_3$ is summed continuously so that cursors 24 and 26 move in accordance with the N—S and E—W components separately with the result that intersection P, FIG. 4, of the crosshairs on cursors 24 and 26 will at all times indicate the position of the aircraft with referenec to the reference point. The range is set for the instrument by adjusting knob 173 before the flight is begun depending upon the total distance to be traversed by the aircraft to insure that the flight is maintained on the plotting board. In view of the continuous nature of the operation of this apparatus, it is only necessary for the pilot to fly the aircraft so that the intersection P of the crosshairs of the cursors is moved to a selected point on the plotting board. The operator can turn the apparatus off at any time, and reactivate it from any desired reference point. One or more overlays for board 23 may be provided for the convenience of the pilot or operator for this purpose.

It is thus seen that there has been provided a novel, automatically operated dead reckoning apparatus suitable for use aboard aircraft. It is seen of course that under certain circumstances the apparatus herein disclosed can be used on other types of vehicles, or that other types of data may be inserted into the input resolver units shown in FIG. 4, and that this apparatus may be used as a visual indicating computer for combining and integrating a pair of vectors pictorially. Furthermore, automatic input signal changing means may be provided instead of the manual wind data input of the apparatus which would extend the usefulness of the invention to other circumstances. It is apparent from an examination of this apparatus that its very compactness, lightness in weight, rugged construction and convenient display makes it suitable for portable use under adverse conditions where accuracy is desired.

Obviously many modifications and variations of the present invention are possible in the light of the above teachings. It is therefore to be understood, that within the scope of the appended claims, the invention may be practiced otherwise than as specifically described.

What is claimed is:

1. Aircraft ground position computing and indicating apparatus comprising, first resolver means for resolving an aircraft's velocity vector into x-axis and y-axis components and having a first resolver wheel and a first resolver slide disposed for movement diametrically of said first resolver wheel, means for turning said first resolver wheel through an angle proportional to a course heading of an aircraft, means for linearly moving said first resolver slide through a distance proportional to the magnitude of a true airspeed of the aircraft, a first x-axis vector component member adapted to be moved in a rectilinear path by said first resolver slide a distance proportional to and representative of a vector component along an x-axis of the aircraft's true airspeed velocity vector, a first y-axis vector component member adapted to be moved in a rectilinear path by said first resolver slide a distance proportional to and representative of a vector component along a y-axis of the aircraft's true airspeed velocity vector, second resolver means for resolving a wind velocity vector into x-axis and y-axis components and having a second resolver wheel and a second resolver slide disposed for movement diametrically of said second resolver wheel, means for turning said second resolver wheel through an angle proportional to the direction of the wind velocity vector, means for linearly moving said second resolver slide through a distance proportional to the magnitude of the wind velocity vector, a second x-axis vector component member adapted to be moved in a rectilinear path by said second resolver slide a distance proportional to and representative of a vector component along the x-axis of the wind velocity vector, a second y-axis vector component member adapted to be moved in a rectilinear path by said second resolver slide a distance proportional to and representative of vector component along the y-axis of the wind velocity vector, x-axis integrating means for continuously summing the movement of said first and second x-axis vector component members, y-axis integrating means for continuously summing the movement of said first and second y-axis vector component members, a first cursor movable in a plane along the x-axis in accordance with the output of said x-axis integrating means, and a second cursor movable in a plane along the y-axis in accordance with the output of said y-axis integrating means, and the point of intersection of said first and second cursors representing the instantaneous position of the aircraft relative to a starting point.

2. Aircraft ground position computing and indicating apparatus comprising, first resolver means for resolving an aircraft's velocity vector into x-axis and y-axis components and having a first resolver wheel and a first resolver slide disposed for movement diametrically of said first resolver wheel, means for turning said first resolver wheel through an angle proportional to a course heading of an aircraft, means for linearly moving said first resolver slide through a distance proportional to the magnitude of a true airspeed of the aircraft, a first x-axis vector component member adapted to be moved in a rectilinear path by said first resolver slide a distance proportional to and representative of a vector component along an x-axis of the aircraft's true airspeed velocity vector, a first y-axis vector component member adapted to be moved in a rectilinear path by said first resolver slide a distance proportional to and representative of a vector component along a y-axis of the aircraft's true airspeed velocity vector, second resolver means for resolving a wind velocity vector into x-axis and y-axis components and having a second resolver wheel and a second resolver slide disposed for movement diametrically of said second resolver wheel, means for turning said second resolver wheel through an angle proportional to the direction of the wind velocity vector, means for linearly moving said second resolver slide through a distance proportional to the magnitude of the wind velocity vector, a second x-axis vector component member adapted to be moved in a rectilinear path by said second resolver slide a distance proportional to and representative of a vector component along the x-axis of the wind velocity vector, a second y-axis vector component member adapted to be moved in a rectilinear path by said second resolver slide a distance proportional to and representative of a vector component along the y-axis of the wind velocity vector, x-axis integrating means for continuously summing the movement of said first and second x-axis vector component members, y-axis integrating means for continuously summing the movement of said first and second y-axis vector component members, a first cursor movable in a plane along the x-axis in accordance with the output of said x-axis integrating means, a second cursor movable in a plane along the y-axis in accordance with the output of said y-axis integrating means, the point of intersection of said first and second cursors representing the instantaneous position of the aircraft relative to a starting point, and variable speed transmission means for selecting the range in distance covered by said apparatus by changing the output speed of said x-axis and said y-axis integrating means.

3. Aircraft ground position computing and indicating apparatus comprising, first resolver means for resolving an aircraft's velocity vector into x-axis and y-axis components and having a first resolver wheel and a first resolver slide disposed for movement diametrically of said first resolver wheel, synchro motor means for turning said first resolver wheel through an angle proportional to a course heading of an aircraft, synchro motor means for linearly moving said first resolver slide through a distance proportional to the magnitude of a true airspeed of the aircraft, a first x-axis vector component member adapted to be moved in a rectilinear path by said first resolver slide a distance proportional to and representative of a vector component along an x-axis of the aircraft's true airspeed velocity vector, a first y-axis vector component member adapted to be moved in a rectilinear path by said first resolver slide a distance proportional to and representative of a vector component along a y-axis of the aircraft's true airspeed velocity vector, second resolver means for resolving a wind velocity vector into x-axis and y-axis components and having a second resolver wheel and a second resolver slide disposed for movement diametrically of said second resolver wheel, means for turning said second resolver wheel through an angle proportional to the direction of the wind velocity vector, means for linearly moving said second resolver slide through a distance proportional to the magnitude of the wind velocity vector, a second x-axis vector component member adapted to be moved in a rectilinear path by said second resolver slide a distance proportional to and representative of a vector component along the x-axis of the wind velocity vector, a second y-axis vector component member adapted to be moved in a rectilinear path by said second resolver slide a distance proportional to and representative of a vector component along the y-axis of the wind velocity vector, x-axis integrating means for continuously summing the movement of said first and second x-axis vector component members, y-axis integrating means for continuously summing the movement of said first and second y-axis vector component members, a first cursor movable in a plane along the x-axis in accordance with the output of said x-axis integrating means, and a second cursor movable in a plane along the y-axis in accordance with the output of said y-axis integrating means, and the point of intersection of said first and second cursors representing the instantaneous position of the aircraft relative to a starting point.

4. Aircraft ground position computing and indicating apparatus comprising, first resolver means for resolving an aircraft's velocity vector into x-axis and y-axis components and having a first resolver wheel and a first resolver slide disposed for movement diametrically of said first resolver wheel, means for turning said first resolver wheel through an angle proportional to a course heading of an aircraft, synchro motor means for linearly moving said first resolver slide between two extreme positions and through a distance from one of the extreme positions towards the other extreme position proportional to the magnitude of a true airspeed of the aircraft, limit switch means for automatically causing temporary reversal of said motor means when said first resolver slide is moved to either of the extreme positions to return said first resolver slide into the adjustable range thereof, a first x-axis vector component member adapted to be moved in a rectilinear path by said first resolver slide a distance proportional to and representative of a vector component along an x-axis of the aircraft's true airspeed velocity vector, a first y-axis vector component member adapted to be moved in a rectilinear path by said first resolver slide a distance proportional to and representative of a vector component along a y-axis of the aircraft's true airspeed velocity vector, second resolver means for resolving a wind velocity vector into x-axis and y-axis components and having a second resolver wheel and a second resolver slide disposed for movement diametrically of said second resolver wheel, means for turning said second resolver wheel through an angle proportional to the direction of the wind velocity vector, means for linearly moving said second resolver slide through a distance proportional to the magnitude of the wind velocity vector, a second x-axis vector component member adapted to be moved in a rectilinear path by said second resolver slide a distance proportional to and representative of a vector component along the x-axis of the wind velocity vector, a second y-axis vector component member adapted to be moved in a rectilinear path by said second resolver slide a distance proportional to and representative of a vector component along the y-axis of the wind velocity vector, x-axis integrating means for continuously summing the movement of said first and second x-axis vector component members, y-axis integrating means for continuously summing the movement of said first and second y-axis vector component members, a first cursor movable in a plane along the x-axis in accordance with the output of said x-axis integrating means, and a second cursor movable in a plane along the y-axis in accordance with the output of said y-axis integrating means, and the point of intersection of said first and second cursors representing the instantaneous position of the aircraft relative to a starting point.

5. Aircraft ground position computing and indicating apparatus comprising, first resolver means for resolving an aircraft's velocity vector into x-axis and y-axis components and having a first resolver wheel and a first resolver slide disposed for movement diametrically of said first resolver wheel, synchro motor means for turning said first resolver wheel through an angle proportional to a course heading of an aircraft, synchro motor means for linearly moving said first resolver slide between two extreme positions and through a distance from one of the extreme positions towards the other extreme position proportional to the magnitude of a true airspeed of the aircraft, limit switch means for automatically causing temporary reversal of said motor means when said first resolver slide is moved to either of the extreme positions to return said first resolver slide into the adjustable range thereof, a first x-axis vector component member adapted to be moved in a rectilinear path by said first resolver slide a distance proportional to and representative of a vector component along an x-axis of the aircraft's true airspeed velocity vector, a first y-axis vector component member adapted to be moved in a rectilinear path by said first resolver slide a distance proportional to and representative of a vector component along a y-axis of the aircraft's true airspeed velocity vector, second resolver means for resolving a wind velocity vector into x-axis and y-axis components and having a second resolver wheel and a second resolver slide disposed for movement diametrically of said second resolver wheel, means for turning said second resolver wheel through an angle proportional to the direction of the wind velocity vector, means for linearly moving said second resolver slide through a distance proportional to the magnitude of the wind velocity vector, a second x-axis vector component member adapted to be moved in a rectilinear path by said second resolver slide a distance proportional to and representative of a vector component along the x-axis of the wind velocity vector, a second y-axis vector component member adapted to be moved in a rectilinear path by said second resolver slide a distance proportional to and representative of a vector component along the y-axis of the wind velocity vector, x-axis and y-axis integrating means including a rotating integrating disc for continuously summing the movement of said first and second x-axis vector component members and for continuously summing the movement of said first and second y-axis vector component members, constant speed motor means for driving said integrating disc, variable speed transmission means for changing the speed of said integrating disc and thereby selecting the distance range of the apparatus, a first cursor movable in a plane along the x-axis in accordance with the output of said x-axis integrating means, a second cursor movable in a plane along the y-axis in accordance with the output of said y-axis integrating means, the point of intersection of said first and second cursors representing the instantaneous position of the aircraft relative to a starting point, and plotting board means for tracing the projection of the intersection of said cursors to indicate the instantaneous ground position of the aircraft.

References Cited in the file of this patent
UNITED STATES PATENTS

| | | |
|---|---|---|
| 1,985,266 | Smith et al. | Dec. 25, 1934 |
| 2,403,152 | Roters | July 2, 1946 |
| 2,714,047 | Dehmel | July 26, 1955 |
| 2,818,211 | Macklen | Dec. 31, 1957 |
| 2,923,468 | Rappaport | Feb. 2, 1960 |
| 2,936,950 | Parsons | May 17, 1960 |